(12) United States Patent
Weidenfeller et al.

(10) Patent No.: US 10,499,208 B2
(45) Date of Patent: Dec. 3, 2019

(54) PROVISION OF AN EVENT MESSAGE TO A USER

(71) Applicant: Telefonaktiebolaget LM Ericsson (publ), Stockholm (SE)

(72) Inventors: Thomas Weidenfeller, Aachen (DE); Tim Lauterbach, Kerkrade (NL)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 161 days.

(21) Appl. No.: 15/317,010

(22) PCT Filed: Jun. 11, 2015

(86) PCT No.: PCT/EP2015/063063
§ 371 (c)(1),
(2) Date: Dec. 7, 2016

(87) PCT Pub. No.: WO2015/189334
PCT Pub. Date: Dec. 17, 2015

(65) Prior Publication Data
US 2017/0105103 A1  Apr. 13, 2017

Related U.S. Application Data

(60) Provisional application No. 62/011,217, filed on Jun. 12, 2014.

(51) Int. Cl.
*H04W 4/18* (2009.01)
*H04W 4/029* (2018.01)
(Continued)

(52) U.S. Cl.
CPC ............ *H04W 4/185* (2013.01); *H04H 60/49* (2013.01); *H04L 67/16* (2013.01); *H04W 4/02* (2013.01);
(Continued)

(58) Field of Classification Search
None
See application file for complete search history.

(56) References Cited

U.S. PATENT DOCUMENTS

2009/0247208 A1  10/2009 Lohmar et al.
2013/0250844 A1* 9/2013 Lee .................. H04W 4/06
370/312
(Continued)

FOREIGN PATENT DOCUMENTS

WO  2014010102 A1  1/2014
WO  2015131927 A1  9/2015

OTHER PUBLICATIONS

3GPP, "3rd Generation Partnership Project; Technical Specification Group Services and System Aspects; Multimedia Broadcast/Multicast Service (MBMS) user services; Stage 1 (Release 11)", 3GPP TS 22.246 V11.0.0, Sep. 2012, 1-17.
(Continued)

*Primary Examiner* — Lonnie V Sweet
(74) *Attorney, Agent, or Firm* — Murphy, Bilak & Homiller, PLLC (57) ABSTRACT

A method for broadcasting an event message to a geographical area comprising the steps of receiving (S61) an event message with geographical information for which the event message is relevant; requesting (S62) information about available service areas and/or logical areas, wherein at least one logical area is covered by a service area; determining (S63) at least one affected geographical area based on the geographical information of the event message and the received service and/or logical areas; and providing (S64) the event message to the at least one affected geographical area.

4 Claims, 10 Drawing Sheets

(51) Int. Cl.
  *H04W 4/06* (2009.01)
  *H04W 4/02* (2018.01)
  *H04H 60/49* (2008.01)
  *H04L 29/08* (2006.01)
  *H04W 4/021* (2018.01)
  *H04L 12/18* (2006.01)

(52) U.S. Cl.
  CPC ............ *H04W 4/029* (2018.02); *H04W 4/06* (2013.01); *H04L 12/189* (2013.01); *H04W 4/021* (2013.01)

(56) References Cited

U.S. PATENT DOCUMENTS

| | | | |
|---|---|---|---|
| 2013/0276017 A1 | 10/2013 | Walker et al. | |
| 2014/0050137 A1* | 2/2014 | Alberth, Jr. | H04W 4/06 370/312 |
| 2015/0140924 A1* | 5/2015 | Marathe | H04W 4/90 455/3.01 |

OTHER PUBLICATIONS

3GPP, "3rd Generation Partnership Project; Technical Specification Group Services and System Aspects; Multimedia Broadcast/Multicast Service (MBMS); Architecture and functional description (Release 12)", 3GPP TS 23.246 V12.0.0, Dec. 2013, 1-66.

3GPP, "3rd Generation Partnership Project; Technical Specification Group Services and System Aspects; Multimedia Broadcast/Multicast Service (MBMS); Protocols and codecs (Release 12)", 3GPP TS 26.346 V12.0.0, Dec. 2013, 1-178.

* cited by examiner

PROVISION OF AN EVENT MESSAGE TO A USER

TECHNICAL FIELD

The present disclosure relates to techniques for providing event messages to a user, in particular messages which are currently relevant. In particular the present disclosure relates to techniques for providing geographically related services or event messages to a user.

The present disclosure may be used in a scenario using eMBMS (enhanced Multimedia Broadcast-Multicast Service) for transmission of event messages. Further the present disclosure may be practiced within network solutions using a geographical enabler, wherein an implementation of such an enabler is for instance Geo Location Messaging.

BACKGROUND

Multiple systems exist for distributing information about current events, like for example road hazards or natural disaster warnings. Such systems can be based e.g. on broadcasting technology. For example, the Traffic Message Channel (TMC) as part of the radio data system (RDS), using FM radio, is a common system for informing motorists about relevant events happening on the road.

Other systems, for example systems using mobile data connections of mobile telephone systems, don't use broadcasting, but unicasting to inform or warn user about events, like natural disasters.

Most events, like road hazard information or traffic warnings contain among others properties geographic information. This includes a geographic location or extent, describing where the event is happening, and also geographic information about the affected region. For example, a particular traffic jam might have a length, i.e. a geographic extent, of 2 km, and affects driving for 25 km behind the traffic jam on road M12.

Limiting the distribution of messages to a geographic location or extent is called geo targeting. In case of broadcasting the granularity, to which such geographic targeting can be performed, is dictated by the extent and organization of the broadcasting network. For example, the Austrian TMCplus FM radio traffic warning system uses three predefined broadcasting regions only for the whole of Austria, thus limiting geographic targeting of traffic event messages to selecting one or a combination of these three regions for broadcasting.

Another example for broadcasting would be using an enhanced Multimedia Broadcast-Multicast Service (eM-BMS) system, as specified by ETSI and 3GPP (3rd Generation Partnership Project) TS 22.246, TS 23.246. eMBMS adds multicast and broadcast transmission modes to cellular networks. The smallest geographic region to which a broadcast or multicast can be targeted in eMBMS is called a service area (SA). A service area is made up from one or multiple nearby cells of a cellular network. Service areas can be grouped into broadcasting areas (BAs).

Due to the nature of broadcasting (a 1:n communication) the number of parallel receivers is theoretically unlimited, and in practice very high. On the other hand, receivers are not addressed individually, but all at once in a fixed, typically statically predefined, geographic area.

Geographic targeting in case of using unicasting (a 1:1 communication) requires that the sender is aware of the location of the receivers. The granularity of the geographic targeting is dictated by the granularity of the location information available to the sender. Once the sender knows the location of the receivers it can select only those located in an affected region and only unicast an event message to those receivers. This allows a dynamic geographic targeting per event message.

A very fine granularity for unicast event message distribution can be achieved by using Geo Location Messaging (GLM). With such a system the sender can be aware of any receiver's location with the same accuracy and precision the receiver is aware of its own position. E.g. receivers equipped with a global positioning system (GPS) know their location within a few meters, so the GLM sender does, too.

Geo Location Messaging uses unicast connections to send out event messages. At least one unicast connection is used for each receiver. If there are many receivers in the targeted geographic area this can lead to network congestion and the delayed reception of important messages, like a road hazard warning.

The geographic regions to which messages can be sent via broadcasting are fixed by the extent and organization of the broadcasting network. For example, in case of an eMBMS network, the region is fixed by the defined service areas. There is also the possibility that messages are received outside of a designated service area due to the propagation properties of RF signals. Control over the geographic region to which a particular event message is distributed is therefore limited.

Another problem is that when using multiple unrelated event message distribution systems in parallel, e.g. GLM and eMBMS, the duplicate delivery of event messages leads to wasting of network resources.

SUMMARY

There is a demand for a technique distributing event messages to receivers.

It is an object to provide a resource efficient solution for distributing event messages to particular areas within a communication network.

According to an embodiment of the invention, a method for broadcasting an event message to a geographical area is provided. The method comprises the steps: Receiving an event message with geographical information for which the event message is relevant; Requesting information about available service areas and/or logical areas, wherein at least one logical area is covered by a service area; Determining at least one affected geographical area based on the geographical information of the event message and the received service and/or logical areas; Providing the event message to the at least one affected geographical area.

In a preferred embodiment it is proposed that the event message is provided by broadcasting the event message to the at least one affected geographical area.

In a further preferred embodiment it is proposed the event message is provided by broadcasting when the number of receivers exceeds a predefined threshold.

In a preferred embodiment it is proposed that the event message is provided by unicasting the event message to at least one receiver.

The method is preferably implemented in a broadcast event message distribution system, like eMBMS, wherein in one embodiment this system comprises an eMBMS broadcasting control entity being configured with units or modules adapted to perform to above mentioned steps.

According to an embodiment of the invention and as an alternative solution to the aforementioned particular problem, a method for providing an event message for distribution is provided. The method comprises the steps: Receiving the event message with a geographical information for which the event message is relevant; Determining geographical area for which the event message is relevant; Sending the event message to a unicast event message distribution system for distribution to receivers subscribed for reception of the event messages and being in the geographical area; Sending the event message to a broadcast event message distribution system for broadcasting the event messages in the geographical area.

The method is preferably implemented by an event message distribution entity being configured with units or modules adapted to perform to above-mentioned steps.

According to an embodiment of the invention and as an alternative solution to the aforementioned particular problem, a method for activating distribution of an event message via a broadcast event message distribution system is provided. The method comprises the steps: Receiving a receivers list being connected to a unicast event message distribution system and subscribed for reception of an event message; Receiving a list of service areas and/or location areas relevant for distribution of the event message within the broadcast event message distribution system; Determining a number of receivers from the receiver list being also located in a service area and/or logical area; Activating a distribution of an event message via the broadcast event message distribution system when the number satisfies a predefined threshold value.

The method is preferably implemented by a sender entity, in the following also called car with a monitor function and being configured with units or modules adapted to perform to above mentioned steps.

According to an embodiment of the invention and as an alternative solution to the aforementioned particular problem, a method for deciding on reception of an event message via a broadcast event message distribution system is provided. The method comprises the steps: Monitoring an availability of reception of the event messages via a broadcast event message distribution system; Receiving at least one logical area information, broadcasted as message via the broadcast event message distribution system; Comparing an own location with the received logical area information; Deciding on the reception of the event message via the broadcast event message distribution system, when the reception of the event messages via the broadcast event message distribution system is available and the receiver is in the received logical area.

In a preferred embodiment it is proposed to disconnect from the reception of the event messages sent via an event message distribution system.

In a further embodiment it is proposed to connect to the unicast event message distribution system, when the provision of the event messages via the broadcast event message distribution system is not available or the receiver is not in the received logical area.

Available is a reception of an event messages via a broadcast event message distribution system when the end device is capable to receive data over broadcast and when the broadcast event message distribution system is capable to broadcast an event message, for example because there is at least one service area and/or logical area with users for which the event message is relevant.

The method is preferably implemented by a receiver entity, like any end device being configured with units adapted to perform to above-mentioned steps.

In a further embodiment a system is proposed with a sender entity, receiver entity, an event message distribution entity and an eMBMS broadcasting control entity within an broadcast event message distribution system, wherein the entity are adapted to perform the steps as described above.

In a further embodiment a method is proposed implemented in a system as mentioned above.

DETAILED DESCRIPTION OF EMBODIMENTS

In the following description, for purposes of explanation and not limitation, specific details are set forth, such as particular network environments and communication standards etc., in order to provide a thorough understanding of the current invention. It will be apparent to one skilled in the art that the current invention may be practiced in other embodiments that depart from these specific details. For example, the skilled artisan will appreciate that the current invention may be practiced with any wireless network like for example UMTS, GSM or LTE networks. As another example, the invention may also be implemented in short-range wireless networks such as WLAN, Bluetooth or WiFi systems or in wireline networks, for example in any IP-based network.

Figure 1:
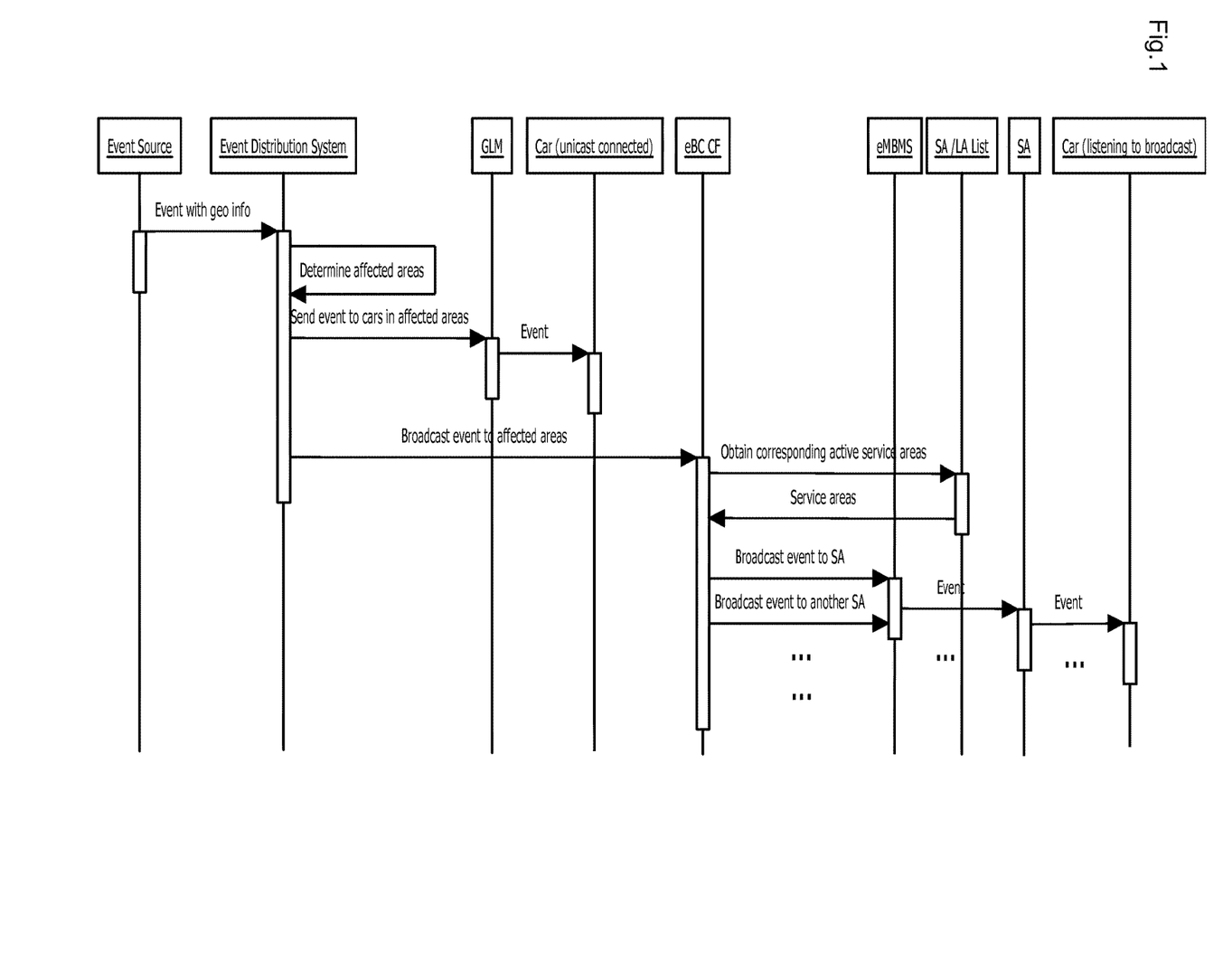
FIG. 1 shows an embodiment for sending an event message.

FIG. 1 shows an embodiment for sending an event message and an embodiment of a system implementing the present techniques. It depicts an example of distributing an event message, like for example a road hazard warning, via the presented system.

In the first step, an event source sends an event message with geo info. The event message may be generated in any preferable way, for example by means of sensors located along a highway and being adapted to recognize a wrong-way driver. The event message may be provided to any nodes being able to adapt the information to be distributed to relevant geographical areas.

In the following an event distribution system is used as a term for such kind of a distribution node. The event distribution system determines in a first step the affected areas, i.e. those areas for which the event information is relevant. Next the event message is sent to the Geo Location Messaging GLM system with information what the GLM shall do with the event message, i.e. send event to cars in affected areas. The GLM system performs the request and distributes the event messages to the receiver, like cars.

In parallel the event message may be distributed from the event distribution system to the eMBMS broadcasting control eBC, with information what the eBC shall do with the event message, i.e. broadcast event message to affected areas. To perform this request the eBS evaluates the service areas SA, i.e. obtain corresponding active service areas SA, by contacting a corresponding list. Upon reception of the service area SA the event message is distributed via a broadcast connection to the enhanced Multimedia Broadcast-Multicast Service eMBMS, which then broadcasts the event message to the corresponding service area SA and then to the receivers, like cars.

In an embodiment it is proposed to provide multiple receivers adapted to receive the event message via unicast and/or broadcast. For simplification the example only shows one of such receivers. Further, the message could be send to all service areas SA which have logical areas overlapping with the affected areas, depicted by " . . . " in FIG. 1.

Figure 2:
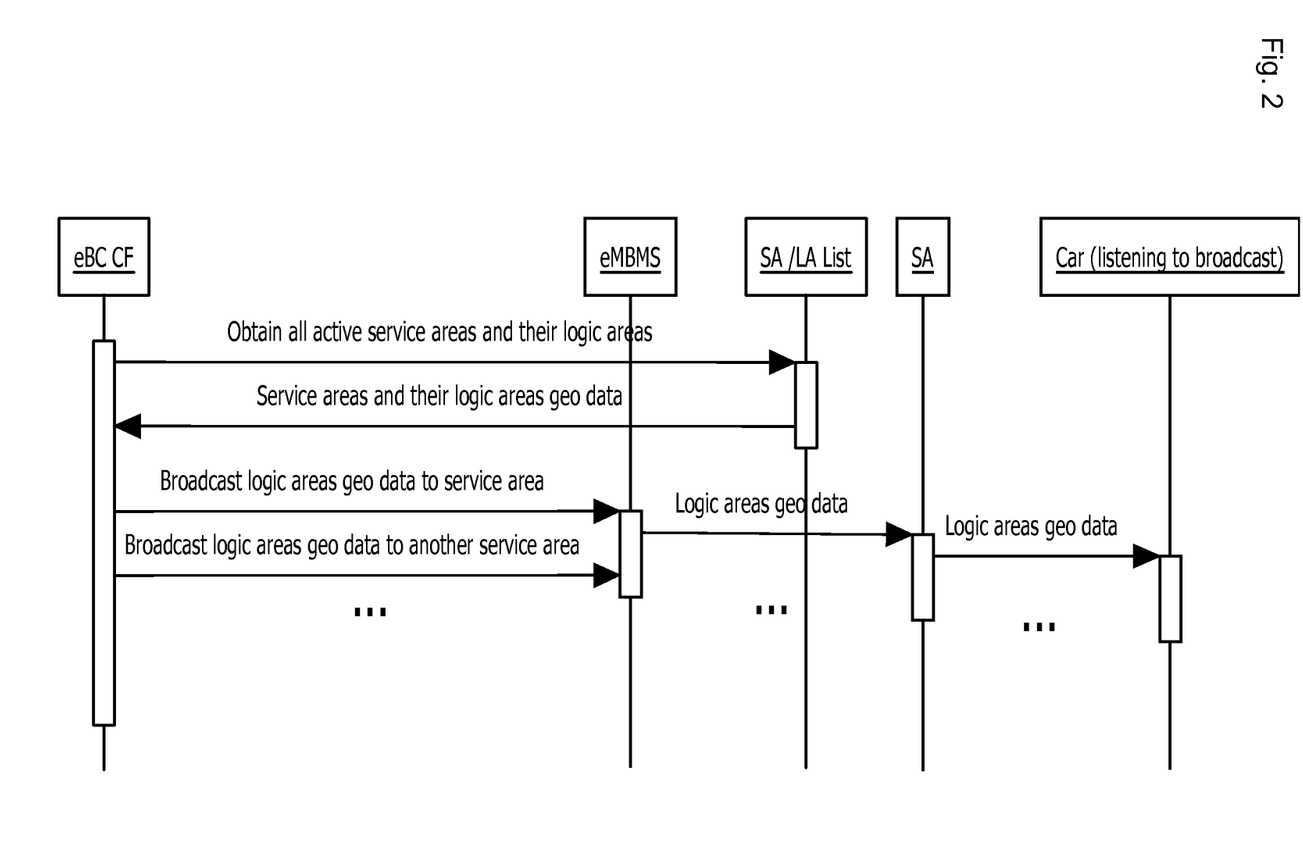
FIG. 2 shows an embodiment for announcing of logical areas via broadcasting to their service areas.

FIG. 2 shows an embodiment for announcing of logical areas via broadcasting to their service areas and a system implementing the present techniques.

In a first step, the eMBMS broadcasting control function eBC CF contacts the SA/LA list to receive the service areas SA with the assigned logical areas LA as defined, for example, by geographical coordinates, i.e. obtains all active service areas SA and their logical areas LA and their geo data of service areas SA and logical areas LA are returned. Furthermore the eBC CF receives from the event distribution system an event message comprising the geographical description of the geographical areas that are relevant for this particular event message. Based on this information and the geo data received form the SA/LA list, the eBC CF determines the relevant SA and the corresponding LAs.

In the next step, geo data of logic areas are broadcasted to service areas, i.e. the event messages are broadcasted to the eMBMS, which then is responsible to broadcast the event messages to the receivers in the particular logical areas, i.e. geo data of the logical areas, via a service area SA to a car. Preferably this is regularly done for all active service areas SA. The sending of particular logical area data to all active service areas SA is indicated by " . . . " in the example according to FIG. 2.

Figure 3:
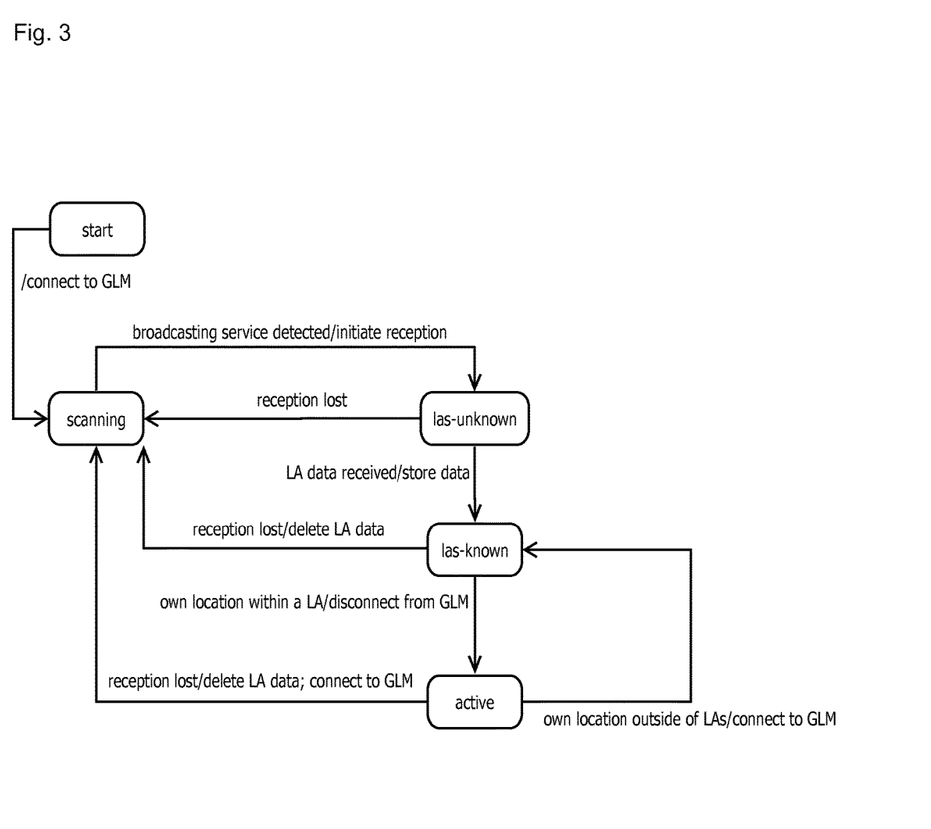
FIG. 3 shows an embodiment for receiver state transitions.

FIG. 3 shows an embodiment for receiver state transitions. When the receiver is activated or started, it connects to a GLM system via unicast and continuously scans for eMBMS event broadcasting services. As part of the GLM connection it makes its own geographic location regularly known to the GLM system.

The receiver continuously monitors or scans the broadcasting reception. When the receiver detects an event broadcasting service it initiates reception of that event broadcasting service. It further transitions the broadcast reception state for that service into the las-unknown state. When the receiver no longer receives a particular event broadcasting service, it removes all information, including state information, about that event broadcasting service from the GLM system and returns to scanning for eMBMS event broadcasting services.

In state las-unknown the receiver continuously monitors all event broadcasting services for the reception of an event message that contains the logical geographic area or areas serviced by this broadcasting service. When such an event message is received the area information is stored and there is a transition of the state of the corresponding event broadcasting service into the las-known state. When the receiver loses the reception, logical geographic area data LA data are deleted and the receiver returns to scanning for eMBMS event broadcasting services.

The receiver continuously compares the logical geographic area or areas of all services in state las-known with its own geographical location. In case the receiver detects that it is located within the logical geographical area, there is transition of the broadcast reception state of the corresponding service into the active state. It starts to read and process event messages it receives via the active broadcasting service.

Further the receiver continuously compares the logical geographic area or areas of all event broadcasting services in the active state with its own geographical location. In case the receiver detects that it is located outside the logical geographical area or areas of the service, there is a transition of the broadcast reception state of the corresponding event broadcasting service into the las-known state, i.e. connects to GLM and stops reading event messages received via that event broadcasting service.

After any of the two above state changes the receiver checks, if at least one broadcasting service in the active state. In case there is at least one event broadcasting service in the active state and it is connected to a GLM system, it disconnects from the GLM system. In case there is no event broadcasting service in the active state the receiver connects to a GLM system via unicast. As part of the GLM connection it makes its geographic location regularly known to the GLM system, and processes event messages received from the GLM system.

The example in FIG. 3 shows a simplified version of the state transition on the receiver side as described above that is used to decide whether to connect to the GLM or whether to listen to broadcast data.

However, the diagram does not show necessary waiting times or delays during transitions.

For example it is proposed in one embodiment not to immediately drop the GLM connection, when the own position is within a logical area. Instead also the direction of the own movement and the stability of the reception could be taken into account. Further, a state machine like the above could be created for every message broadcasting service detected in the scanning state. Preferably, a connection or disconnection to or from the GLM can be coordinated between all such state machines and not only controlled by a single state machine.

Further, it is proposed that a GLM system monitors the number of unicast connections within a specific area. In case this number exceeds a predefined threshold, it activates a predefined eMBMS service area for the geographic area, where the GLM subscribers currently accumulate. By activating this service area the connected devices within that service area with eMBMS event broadcasting reception systems will now find event broadcasting services. Consequently, they will drop out of GLM, thus reliving the GLM from too many subscribers in that area.

In order to measure if a GLM system can deactivate an eMBMS service area, i.e. releasing the broadcasting resources to other network users, a special message is broadcasted via the eMBMS. This special message asks a certain percentage of the eMBMS receivers to report back to the GLM system, if they could also use GLM, if there would be no eMBMS service. If the number of receivers responding to such a special message is lower than a predefined threshold, the GLM system can decide to deactivate this particular service area SA, because it has determined the number of receivers in that service area.

In order to realize this, it is proposed to provide a monitor function on the sending side, inside the GLM system or connected to the GLM system. The monitor function accesses the previously described list of defined eMBMS service areas and their geographic logical areas. The monitor function regularly groups all locations of all receivers that are known to the GLM into the geographical logical areas from the list. The monitor function instructs the eMBMS system to activate the event broadcasting service for an area, if a service area SA is not active and the number of GLM receivers located within the logical geographical area of the service area SA exceeds a predefined threshold. The service area SA is marked as active in the list.

The monitor function considers a service area SA for deactivation, if the number of GLM receivers located within the logical geographical area of the service area SA is below another predefined threshold. The monitor function instructs the eMBMS system to broadcast a special message to service areas SA considered for deactivation. The special message instructs a subset of the broadcasting receivers having the particular service in an active state to report to the monitoring function. The monitoring function groups the responses into the logical geographical areas from the list. It then compares the number of broadcasting receivers that reported and the number of receivers known to the GLM in this logical area to a third predefined threshold. If the result is below the threshold, the monitoring function instructs the eMBMS system to deactivate the service area SA. The service area SA is marked as deactivated in the list.

Figure 4:
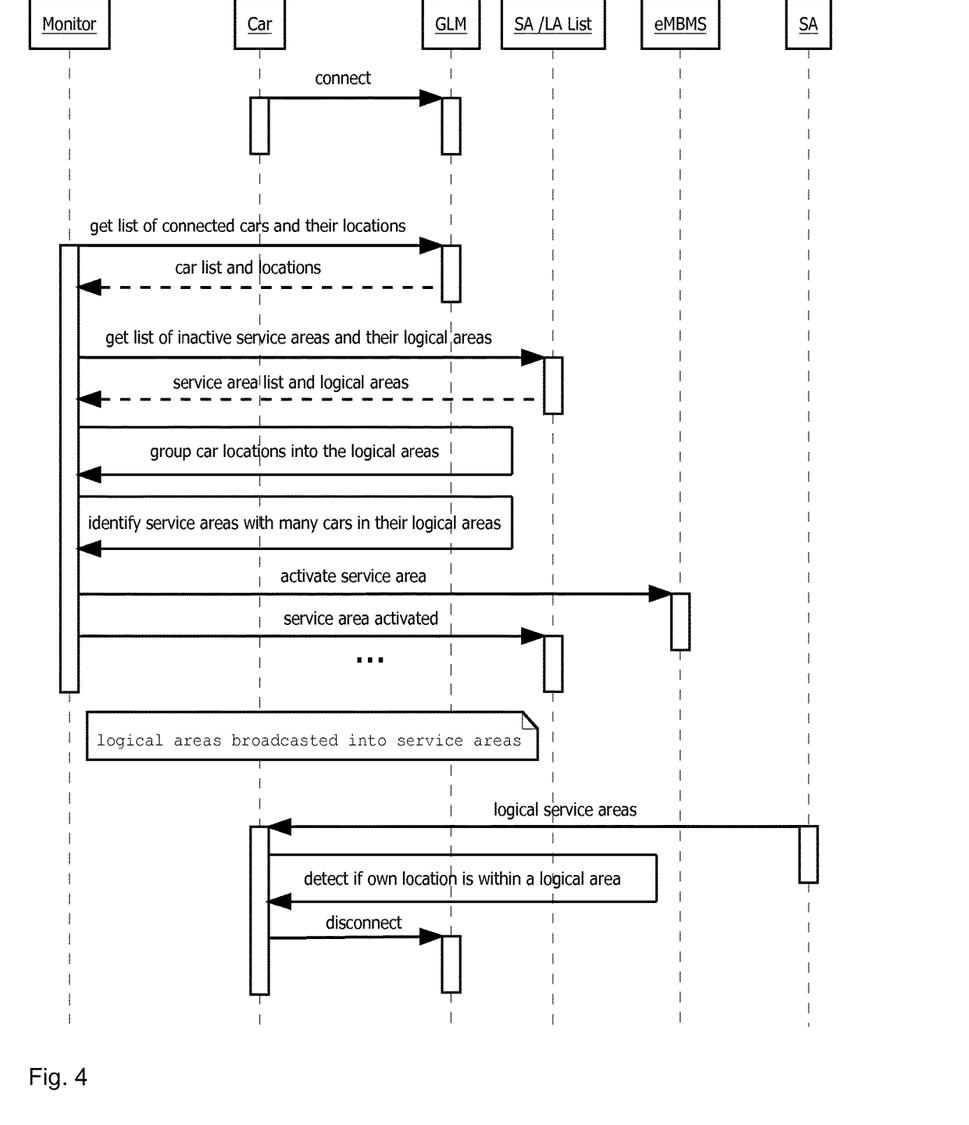
FIG. 4 shows an embodiment for an activation of service areas.

FIG. 4 shows an embodiment for an activation of service areas and a system implementing the present techniques. FIG. 4 depicts a simplified version of how service areas SA are activated on-demand. It may happen that the car in the example is within a logical area LA of one of the newly activated service areas SA and therefore disconnects from the GLM.

In the first connecting step a receiver, like a car, connects via a unicast connection to the GLM. The receiver sends regularly a geographical position so that the GLM is regularly informed about the position of its users. Consequently, a monitor function at the sender side, i.e. GLM, obtains a list, i.e. get list of connected cars and their locations, by asking the GLM. The monitor function contacts the SA/LA list to get inactive service areas SA and their logical areas LA. The service area list and logical areas as answer is received. Based on the received information the monitor function determines a number of receivers, like cars, within the service areas SA and the corresponding logical areas LA. This number is compared with a threshold value and if this number is above the threshold value, a decision is taken to activate the reception of the event messages via a broadcast service.

Furthermore, the receivers, like cars, are adapted to monitor the reception of event messages via the broadcast service. The broadcasted broadcast service comprises the logical areas LA in which this broadcast service is broadcasted. The receiver compares an own geographical location with the received logical areas LA. If the broadcast service is available and the receiver is within the provided logical area LA, then a decision is taken to disconnect from the unicast provision of the event messages, i.e. from the provision from GLM.

Consequently, if a user is outside a logical area LA providing the event messages via a broadcast service or the broadcast service is not available, it is proposed that the user connects to the unicast provision of the event messages, thus to the GLM.

Figure 5:
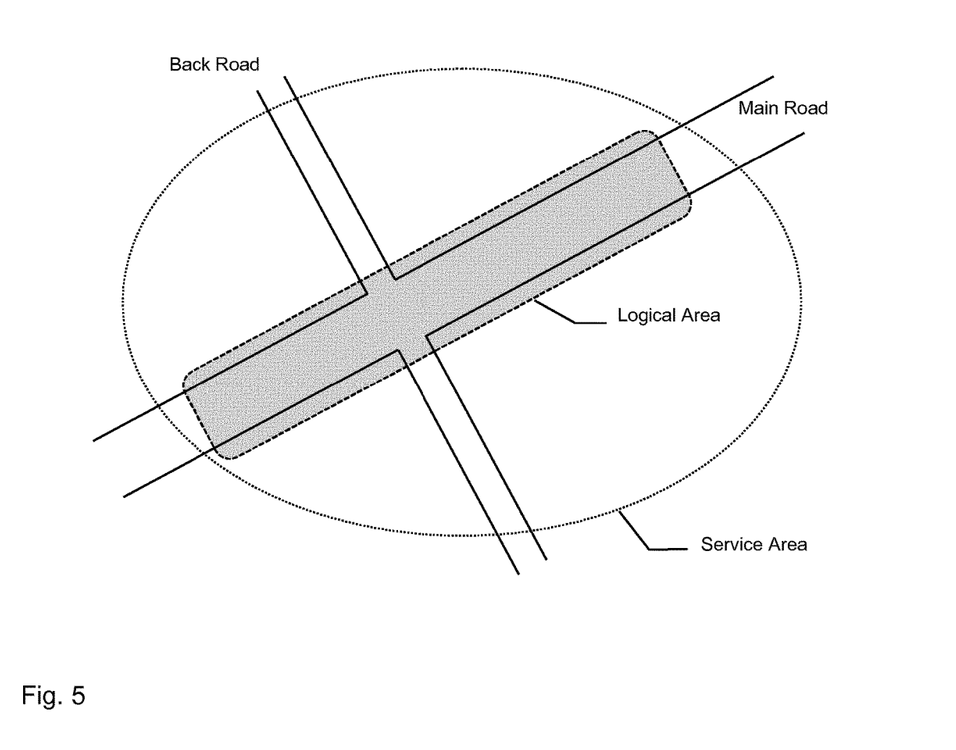
FIG. 5 schematically shows an example of a logical area within a larger service area.

FIG. 5 schematically shows an example of a logical area within a larger service area. FIG. 5 provides an example of a more advanced usage of a logical area LA inside a service area SA. Instead of defining the logical area LA such that it covers the most of the service area SA, the logical area LA is defined to only cover an important main road inside the service area SA. The result is that cars traveling the main road and being equipped with a receiver according to an embodiment of this invention, can switch to broadcasting reception, while cars outside the main road would not. This allows using the broadcast system to broadcast only main-road specific messages, while the urban area around the main road is covered by the GLM system.

Figure 6:
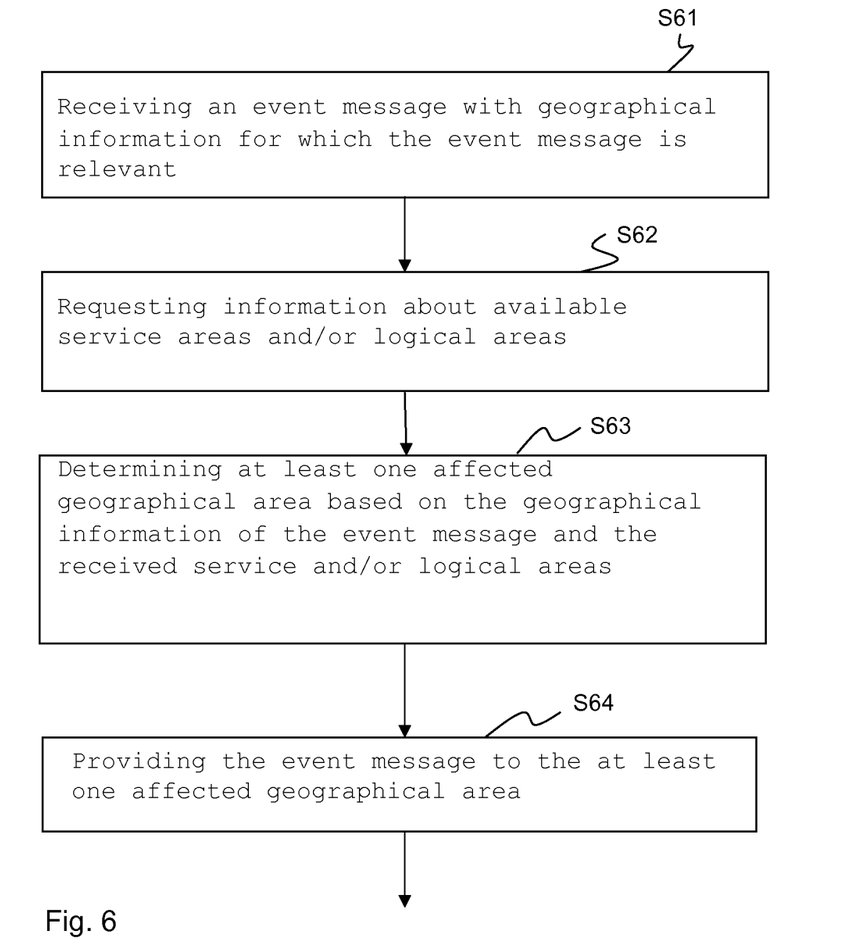
FIG. 6 shows a flow chart of a method being implemented in a broadcast event message distribution system.

FIG. 6 shows a flow chart of a method being implemented in a broadcast event message distribution system. The method for broadcasting the event message to a geographical area comprises the steps of receiving S61 an event message with geographical information for which the event message is relevant; requesting S62 information about available service areas and/or logical areas, wherein at least one logical area is covered by a service area; determining S63 at least one affected geographical area based on the geographical information of the event message and the received service and/or logical areas; and providing S64 the event message to the at least one affected geographical area.

Figure 7:
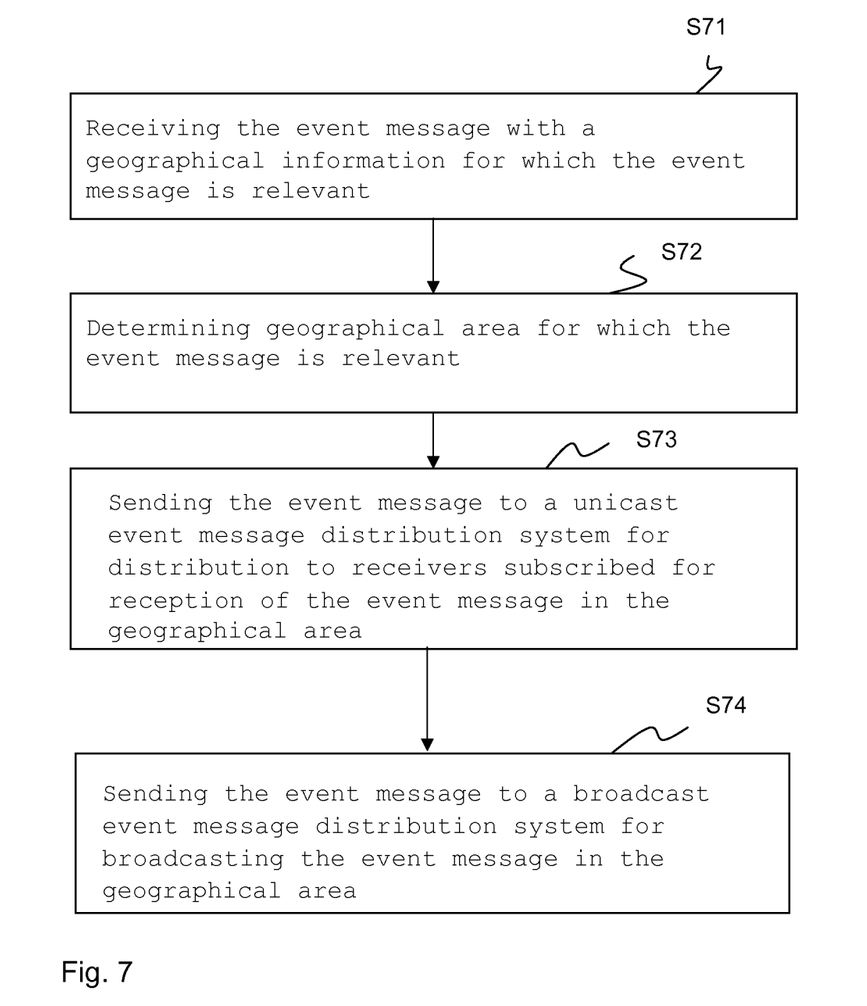
FIG. 7 shows a flow chart of a method being implemented in event message distribution entity.

FIG. 7 shows a flow chart of a method being implemented in event message distribution entity. The method for providing an event message for distribution, comprises the steps of receiving S71 the event message with a geographical information for which the event message is relevant; determining S72 a geographical area for which the event message is relevant; sending S73 the event message to a unicast event message distribution system for distribution to receivers subscribed for reception of the event messages and being in the geographical area; and sending S74 the event message to a broadcast event message distribution system for broadcasting the event messages in the geographical area.

Figure 8:
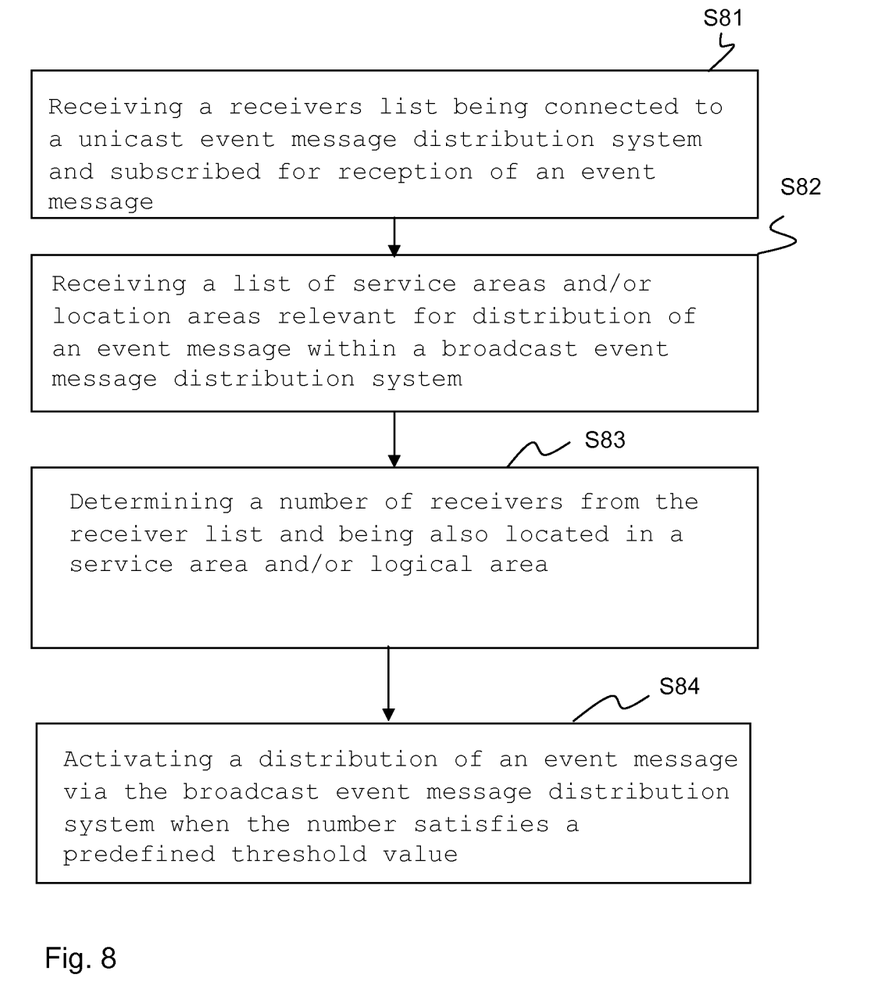
FIG. 8 shows a flow chart of a method being implemented in a sender entity.

FIG. 8 shows a flow chart of a method being implemented in a sender entity. The method for activating distribution of an event message via a broadcast event message distribution system, comprising the steps of receiving S81 a receivers list being connected to a unicast event message distribution system and subscribed for reception of an event message; receiving S82 a list of service areas and/or location areas relevant for distribution of the event message within the broadcast event message distribution system; determining S83 a number of receivers from the receiver list and being also located in a service area and/or logical area; and activating S84 a distribution of an event message via the broadcast event message distribution system when the number satisfies a predefined threshold value.

Figure 9:
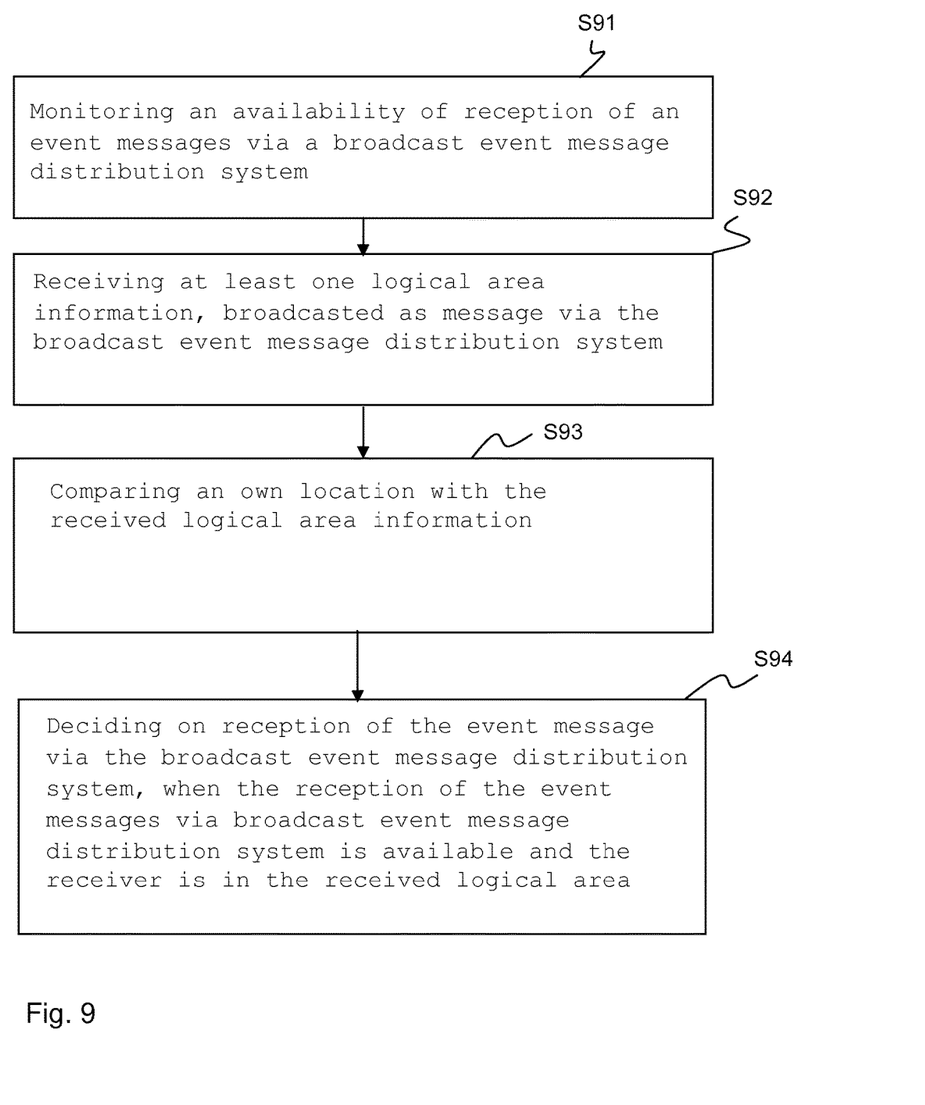
FIG. 9 shows a flow chart of a method being implemented in a receiver entity.

FIG. 9 shows a flow chart of a method being implemented in a receiver entity. The method for deciding on reception of an event message via a broadcast event message distribution system comprises the steps of monitoring S91 an availability of reception of the event messages via a broadcast event message distribution system; receiving S92 at least one logical area information, broadcasted as message via the broadcast event message distribution system; comparing S93 an own location with the received logical area information; and deciding S94 on the reception of the event message via the broadcast event message distribution system, when the reception of the event messages via the broadcast event message distribution system is available and the receiver is in the received logical area.

Figure 10:
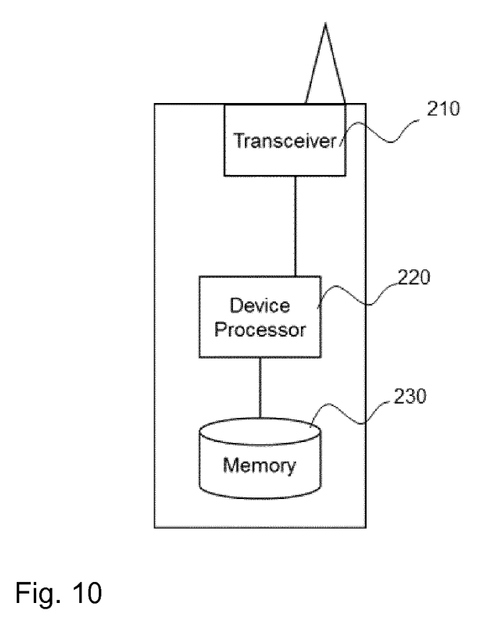
FIG. 10 schematically shows a receiver according to an embodiment.

FIG. 10 schematically shows a receiver according to an embodiment in a block diagram illustrating embodiments of a user or end device or wireless device. Examples of the wireless device include a mobile phone, a smart phone, a PDA (Personal Digital Assistant), a portable computer (e.g., laptop, tablet), or other device that can provide wireless communication. A wireless device may also be referred to as a radio node, user equipment (UE), or an on-board unit in a further device, like for example a car. The wireless device comprises a transceiver 210, a processor 220, and a memory 230. In some embodiments, the transceiver 210 facilitates transmitting wireless signals to and receiving wireless signals from a radio network node (e.g., via an antenna), the processor 220 executes instructions to provide some or all of the functionality described above as being provided by wireless devices, and the memory 230 stores the instructions executed by the processor 220.

The processor 220 may comprise any suitable combination of hardware and software implemented in one or more modules to execute instructions and manipulate data to perform some or all of the described functions of the wireless device. In some embodiments, the processor 220 may include, for example, one or more computers, one or more central processing units (CPUs), one or more microprocessors, one or more applications, and/or other logic.

The memory 230 is generally operable to store instructions, such as a computer program, software, an application comprising one or more of logic, rules, algorithms, code, tables, etc. and/or other instructions capable of being executed by a processor. Examples of memory 230 include computer memory (for example, Random Access Memory (RAM) or Read Only Memory (ROM)), mass storage media (for example, a hard disk), removable storage media (for example, a Compact Disk (CD) or a Digital Video Disk (DVD)), and/or or any other volatile or non-volatile, non-transitory computer-readable and/or computer-executable memory devices that store information.

Alternative embodiments of the wireless device may include additional components beyond those shown in FIG. 10 that may be responsible for providing certain aspects of the wireless device's functionality, including any of the functionality described herein and/or any additional functionality (including any functionality necessary to support the solution described herein).

Figure 11:
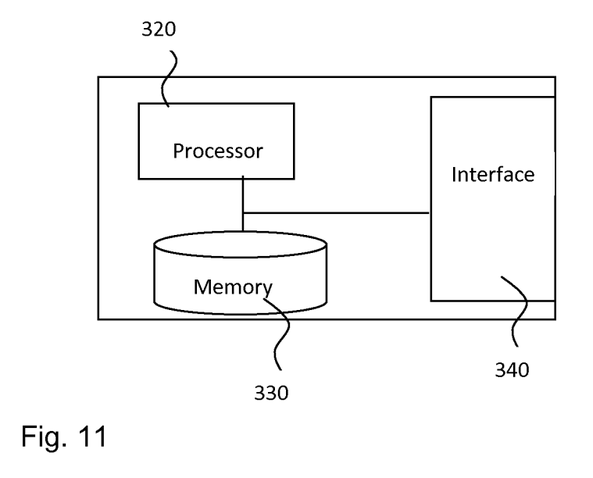
FIG. 11 schematically shows a network node according to an embodiment.

FIG. 11 schematically shows a network node according to an embodiment in a block diagram illustrating embodiments of a network node. A network node may be capable of receiving, processing and sending messages.

The network node comprises a processor 320, a memory 330, and a network interface 340. In some embodiments, the processor 320 executes instructions to provide some or all of the functionality described above as being provided by the network node, the memory 330 stores the instructions executed by the processor 320, and the network interface 340 communicates signals to further network components and end devices, such as a gateway, switch, router, Internet, Public Switched Telephone Network (PSTN), UE etc.

The processor 320 may comprise any suitable combination of hardware and software implemented in one or more modules to execute instructions and manipulate data to perform some or all of the described functions of network node. In some embodiments, processor 320 may include, for example, one or more computers, one or more central processing units (CPUs), one or more microprocessors, one or more applications, and/or other logic.

The memory 330 is generally operable to store instructions, such as a computer program, software, an application comprising one or more of logic, rules, algorithms, code, tables, etc. and/or other instructions capable of being executed by a processor. Examples of memory 330 include computer memory (for example, Random Access Memory (RAM) or Read Only Memory (ROM)), mass storage media (for example, a hard disk), removable storage media (for example, a Compact Disk (CD) or a Digital Video Disk (DVD)), and/or or any other volatile or non-volatile, non-transitory computer-readable and/or computer-executable memory devices that store information.

In some embodiments, the network interface 340 is communicatively coupled to the processor 320 and may refer to any suitable device operable to receive input for the network node, send output from the network node, perform suitable processing of the input or output or both, communicate to other devices, or any combination of the preceding. Network interface 340 may include appropriate hardware (e.g., port, modem, network interface card, etc.) and software, including protocol conversion and data processing capabilities, to communicate through a network.

Alternative embodiments of the network node may include additional components beyond those shown in FIG. 11 that may be responsible for providing certain aspects of the functionality of the network node, including any of the functionality described herein and/or any additional functionality (including any functionality necessary to support the solution described herein). The various different types of network nodes may include components having the same physical hardware but configured (e.g., via programming) to support different radio access technologies, or may represent partly or entirely different physical components.

An event messages may comprise any data informing about a current and/or upcoming event or events being relevant for the users in a particular geographical area. Thus, an event message may be any message that has a geographical relevance. For example it may be information about a wrong-way driver which is relevant for car drivers on a particular highway.

In one embodiment it is proposed that a receiver subscribes to a unicast event message distribution system with fine geographic targeting. In general such system is realized by a geographical enabler, wherein an implementation of such an enabler is for instance Geo Location Messaging GLM. In general a unicast event message distribution system is adapted to offer receivers to connect to it via unicast, to provide their physical location and to subscribe to event messages send via that system.

The Geo Location Messaging GLM system is adapted to enable an application to send messages to registered and subscribed users that are present in a certain geographic area. The shape of this area may be described by a combination of geometric primitives, like lines, line segments, arcs, arc segments, circles, ellipses, rectangles, polygons, more complex primitives like Bezier curves, or others, primitives combined via constructive geometry or any other means to describe an area as such or from the combination of descriptions. In order to receive geographic related information from the GLM, the user has to register thereto. The events are distributed to the users via unicast connection established between the GLM and the registered users, or the users and the GLM. In the following the GLM system will be used for explanation purpose but it should not be understood as any limitation.

Further, it is proposed to implement the present solution in a mobile network supporting a broadcast distribution of data, called also broadcast event message distribution system. In one embodiment it is proposed to provide a mobile network with eMBMS functionality as an example of a broadcast event message distribution system. In particular the present solution applies to a network with planned, defined and configured service areas, like the service areas (SA) in the eMBMS network, or in other words the eMBMS service areas. In the following if the term eMBMS service areas or service area SA is used it is not to be seen as any limitation but as a possible embodiment of any defined service areas in a communication network. In one embodiment it is proposed to use the term service area as any area in which a service is provided.

A Service Area SA is preferably defined by radio cells. A radio cell is a geographic area being defined by a radio coverage of a radio station. Broadcasters and operators frequently produce coverage maps to indicate to users the service area. The ability of a mobile phone to connect to a base station depends on the strength of transmission signal.

In one embodiment it is proposed to provide logical geographic areas. The logical geographic area is a subset of the area physically covered by the service area. The logical geographic area describes an area for which a service area shall carry event messages. For example, a service area might physically cover a semi-circular region around a part of a highway and smaller roads. Since only messages intended for the traffic on a highway, not on normal roads, are supposed to be broadcasted in that service area the logical geographic area description for that service area would only cover the highway as such. In other words, a logical area is defined within a service area and provides a geographical area within a service area. A service area may have one or more logical areas. The logical area is defined in any suitable way, for example by using geometric primitives and their combinations, or other means, as described above for GLM areas and for example by using geographical coordinates for describing a geographical area.

In one embodiment it is proposed to provide a list, SA/LA list, of the eMBMS service areas in a mobile network. The list further contains the status of each service area (e.g. activated or deactivated), the broadcasting area or areas to which a service area belongs, and the logical geographic area or areas inside each service area, and therefore covered by the service areas. The list can be implemented as a database. The content of the list may be created as part of network management activities, in cooperation with service providers. The list may contain further information.

Further, it is proposed to provide an eMBMS broadcasting control entity, also called in the present description eMBMS broadcasting control function (eBC CF). In one embodiment it is proposed that the eBC CF is connected to the eMBMS system. This function may be implemented as an entity.

An entity within the meaning of the present specification is any arrangement suitable for providing a given function, wherein the entity can be a unit located in one node of a network or it can be a system spread out over different nodes. The entity can be embodied as hardware, software or any suitable combination of hardware or software.

An example of an entity being implemented in a network node is provided with respect to FIG. 11. The network node is adapted to perform the method steps of the corresponding entity.

Further it is proposed to provide an event message distribution entity, also called an event message distribution system or just event distribution system. The system contains an event message-provisioning interface for delivering event messages that should be distributed to the users. Further the event message distribution system comprises an interface adapted to receive event messages that are to be distributed.

Further, it is proposed to provide a monitor function preferably on the sending side inside the GLM system or connected to the GLM system. The monitor function is configured to access the list of defined eMBMS service areas and their logical geographic areas. Further the monitor function is configured to regularly group the locations of all receivers known to the GLM into the logical geographical areas from the list. The monitor function is further configured to instruct the eMBMS system to activate service for an area if a service area is not active and if the number of GLM receivers located within the service area's logical geographical area exceeds a predefined threshold. The service area is marked as active in the list.

In the frame of the present disclosure, the activation of a service within a service area is realized by establishing or opening an eMBMS bearer for communication. The deactivation of the service means accordingly the closing of the eMBMS bearer.

Further it is proposed to provide a receiver. The receiver, when it is activated or started continuously scans for eMBMS event broadcasting services. Further, the receiver is capable to connect to a GLM system via unicast. As part of the GLM connection the receiver makes its geographic location regularly known to the GLM system. The receiver may be realized as part of any suitable end device. In one embodiment it is proposed to provide a suitable end device (on-board-unit) or several devices in a car. In particular the device may comprise some means (GPS) to identify its own location, a mobile data connection (a UE), any further means like a user interface e.g. for displaying traffic warnings. The mobile data connection may be performed via a unicast or via eMBMS broadcasts. In the following the receiver will be also called car.

Thus a receiver may be any type of end device, which is capable of operating to provide event messages to the user. An example of a receiver being implemented in a receiver node is provided in respect to FIG. 10. The receiver node also called end device is adapted to perform the method steps of the described receiver.

According to an embodiment of the invention, a method for deciding on the validity or reception of an event message via a broadcast event message distribution system is provided. In one embodiment it is proposed that the receiver receives a message and check the content of the message. The message could be a message with new/changed logical area LAs, for example which ones one still wants to receive, even if outside of the current LAs, or any administrative message or an event message. Only after it is figured out that however the message is relevant but the receiver is not inside a LA, the message is ignored because the message is not valid for the LA. Thus, it is proposed to decide on the validity of a message. In general the present disclosure proposes to combine the distribution of the messages via a GLM system, and an eMBMS broadcasting system.

Further it is proposed that the receiver, if equipped with the necessary function, monitors the reception of an event broadcasting services, for example based on eMBMS. Should a receiver managed to receive at least one event broadcasting service, and this service evaluates as being applicable then the receiver releases its GLM unicast connection. Thus it frees up radio resources, which in turn reduces the likelihood of network congestion if an event is distributed via GLM.

In case a receiver is not able to manage to receive any event broadcasting service, or should those services all evaluate as not being applicable or should the receiver not be equipped with a broadcasting event message receiver, it is proposed that the receiver keeps its GLM connection or if it does not have one initiates a connection to the GLM system.

In general it is proposed that a receiver signs up for and drops out of the GLM system depending on eMBMS broadcasting service reception.

To support receivers in their evaluation if an event broadcasting service is applicable, it is proposed to broadcast an extend of the geographic area for which a receiver of that broadcasting service can expect to find event messages in the broadcast in regular intervals. Typically, the geographic extend, as announced in the broadcast, would be smaller than the broadcasting service area. In one embodiment it is proposed to define and use the logical geographical areas also called logical areas as an embodiment of a geographic extend.

It is proposed that the eMBMS broadcasting control function regularly reads and processes the above-described list of service areas. For each active service area it extracts the logical geographic area information. The event message which is to be distributed is to be translated into a broadcasting message and is then broadcasted into the corresponding broadcasting service, linked to the service area for the particular logical geographic area.

An event message distribution system is provided which is capable for distributing event messages to the users. The event messages contain, among others, geographic information. On reception of an event message by the event distribution system the event message is analyzed. From the geographic information in that message the smallest affected area or areas are determined. An affected area is an area on which the event is supposed to have an effect. Consequently all potential receivers within that area should be informed of the particular event.

The analysis information about the affected area(s) and the message is forwarded to the GLM system, instructing the system to unicast the message to all known receivers in the affected area. The GLM identifies the known receivers in the affected area, using the location information provided by the end devices for example by means of GPS. If necessary the GLM translates the message into a format understood by the receivers and being used by the GLM system. For each receiver found as being located in the affected area the translated message is send to the receiver via unicast.

The analysis information about the affected area(s) and the message is also forwarded to the eMBMS broadcasting control function from the event message distribution system. The eMBMS broadcasting control function, when receiving information about an affected area and a message, uses the above-described list to crosscheck the received affected area information with the logical geographic areas in the list. Should the control function detect an overlap between the affected area and one or more logical geographic areas it instructs the eMBMS system for each service area with such an overlap to broadcast the message via that service area.

This section illustrates an example of a network that may use particular embodiments of the disclosure. A network node may be part of any suitable wireless technology, such as long term evolution (LTE), LTE-Advanced, UMTS, HSPA, GSM, cdma2000, WiMax, WiFi, and/or other suitable wireless technology. The network may include any suitable combination of one or more radio access technologies. However, the scope of the disclosure is not limited to the examples and other embodiments could use different wireless technologies.

An example network may include one or more wireless devices, one or more radio network nodes capable of communicating with these wireless devices. The network may also include any additional network nodes suitable to support communication towards wireless devices or between a wireless device and another communication device. A wireless device may include any suitable combination of hardware and/or software.

For example, in particular embodiments, a wireless device may include the components described with respect to the aforementioned FIG. 10. Similarly, a network node may include any suitable combination of hardware and/or software. For example, in particular embodiments, a network node may include the components described with respect to the aforementioned FIG. 11 The network may include multiple different types of network nodes including, for example, cell nodes (e.g., base stations, eNodeBs), relay nodes, any network node.

Some embodiments of the disclosure may provide one or more technical advantages. Some embodiments may benefit from some, none, or all of these advantages. Other technical advantages may be readily ascertained by one of ordinary skill in the art. An advantage occurs from the fact information is distributed only to potentially affected service users (geographic targeting), e.g. in the above example only to service users potentially affected by the traffic jam because they are located in the affected region. The benefit of geographic targeting is mainly in potentially saving bandwidth, as well in the case of broadcasting as in the case of unicasting.

By letting a GLM system and an eMBMS system interact in the described way it is possible to limit the probability of a network congestion caused by GLM. This in turn increases the reliability of the message reception of important road hazard warning messages or similar messages.

Further, by providing a way for the GLM to identify if a particular eMBMS service area is no longer populated with many receivers the GLM can decide when to de-activate a service area, releasing the eMBMS radio resources for other purposes.

Letting the eMBMS broadcasting system regularly announce which geographic area the particular event message broadcasting service covers provides the connected devices with the necessary information to decide if they can drop out of GLM connection/reception or if they need to stay with the GLM system.

The combined system of GLM and eMBMS allows to cover large areas with a single GLM system, for example rural areas with few subscribers, while "hot spots", like cities are covered by eMBMS broadcasting.

While utilizing two inherently different systems, GLM and eMBMS, it is, however, possible to provide a unified view to event message distribution, from the point of view of the one generating and sending the messages (road authorities, sensor networks, etc.). I.e. they deal with one unified, automatically interacting system, instead of two separate ones.

It is to be understood that the examples and embodiments as explained above are merely illustrative and susceptible to various modifications. For example, the concepts could be used in other types of mobile communication networks, not explicitly mentioned so far. Further, it is to be understood that the above concepts may be implemented by using correspondingly designed software in existing nodes, or by using dedicated hardware in the respective nodes.

The invention claimed is:

1. A method of operation by a cellular end device configured for operating in a cellular network, the method comprising:

detecting an active broadcasting service for broadcasting event messages;

responsive to detecting the active broadcasting service, determining whether a current location of the cellular end device is in a logical geographical area associated with event-message broadcasting by the broadcasting service; and responsive to determining that the current location of the cellular end device is in the logical geographical area, disconnecting from a unicasting service for delivering event messages to the cellular end device via unicasting, and monitoring for event-message broadcasts by the broadcasting service.

2. A cellular end device comprising:

communication circuitry configured for communicating with a cellular network; and processing circuitry operatively associated with the communication circuitry and configured to:

detect an active broadcasting service for broadcasting event messages;

responsive to detecting the active broadcasting service, determine whether a current location of the cellular end device is in a logical geographical area associated with event-message broadcasting by the broadcasting service; and     responsive to determining that the current location of the cellular end device is in the logical geographical area, disconnect from a unicasting service for delivering event messages to the cellular end device via unicasting, and monitor for event-message broadcasts by the broadcasting service.

3. A method of distributing event messages via a cellular network, the method comprising:

for a service area of the cellular network that is inactive for broadcasting of event messages via a broadcasting service, activating the inactive service area in response to determining that the number of cellular end devices that are within a logical geographical area of the inactive service area and active for unicast reception of event messages exceeds a threshold number; and for a service area of the cellular network that is active for broadcasting of event messages via the broadcasting service, deactivating the active service area in response to determining that the number of cellular end devices that are within a logical geographical area of the active service area and are active for unicast reception of messages is below a threshold number.

4. The method of claim 3, further comprising using a unicasting service to distribute event messages to respective cellular end devices that are operating in logical geographical areas included in any service area that is inactive for broadcasting of event messages.

* * * * *